US008206809B2

(12) United States Patent
Yash et al.

(10) Patent No.: US 8,206,809 B2
(45) Date of Patent: Jun. 26, 2012

(54) MATTE SEAL

(75) Inventors: Michael Yash, Milford, MI (US); Ping Chen, West Bloomfield Hills, MI (US)

(73) Assignee: J. S. T. Corporation, Farmington Hills, MI (US)

( * ) Notice: Subject to any disclaimer, the term of this patent is extended or adjusted under 35 U.S.C. 154(b) by 794 days.

(21) Appl. No.: 11/935,587

(22) Filed: Nov. 6, 2007

(65) Prior Publication Data

US 2009/0117321 A1    May 7, 2009

(51) Int. Cl.
*B32B 3/24* (2006.01)
(52) U.S. Cl. .............. 428/138; 428/131; 16/2.2; 16/2.1
(58) Field of Classification Search .................. 428/138, 428/131; 16/2.2, 2.1
See application file for complete search history.

(56) References Cited

U.S. PATENT DOCUMENTS 3,424,857 A * 1/1969 Kipp et al. ............... 174/153 G
4,081,879 A * 4/1978 Rubright .................... 16/2.2
5,452,494 A * 9/1995 Wright ...................... 16/2.2
5,836,048 A * 11/1998 Rossman et al. .......... 16/2.2
6,787,701 B2 * 9/2004 Yasuda et al. ............. 174/664

OTHER PUBLICATIONS

"Previous Seal Design" (1 Sheet).

* cited by examiner

*Primary Examiner* — William P Watkins, III
(74) *Attorney, Agent, or Firm* — Rader, Fishman & Grauer PLLC

(57) ABSTRACT

A matte seal includes a seal body that extends along and about a width-wise axis. The seal body has a first surface and an opposite parallel second surface and an outer peripheral surface extending to and between the first and second surfaces. The seal body has an inner through hole surface defining a through hole extending along and about the width-wise axis and between and through the first and second surfaces. The seal body has at least one recess formed into the first surface. The at least one recess is disposed apart from and between the inner through hole surface and the outer peripheral surface. The at least one recess extends parallel to the width-wise axis and partially into the seal body.

19 Claims, 11 Drawing Sheets

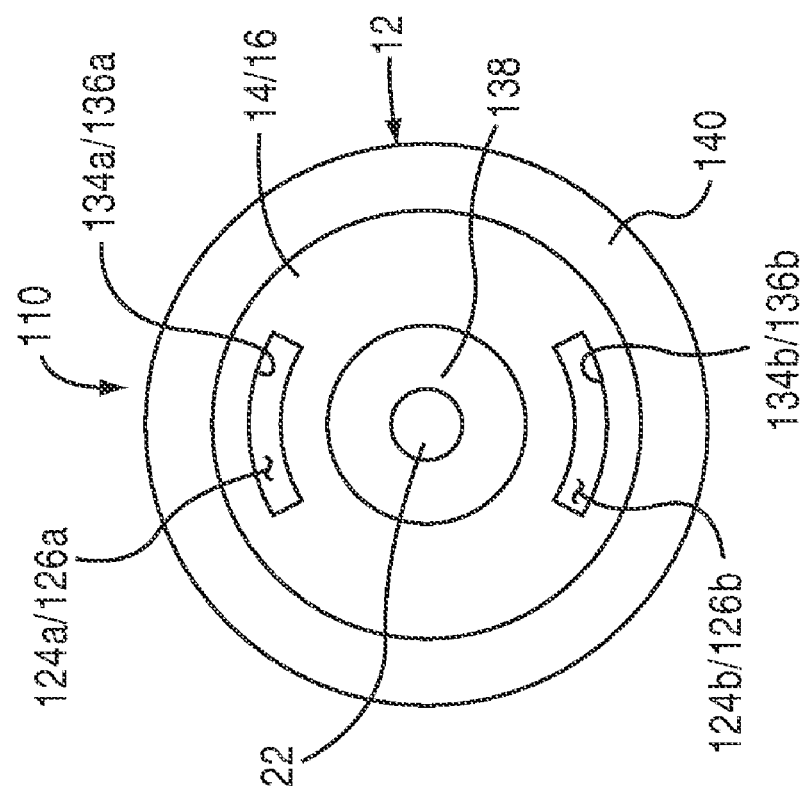
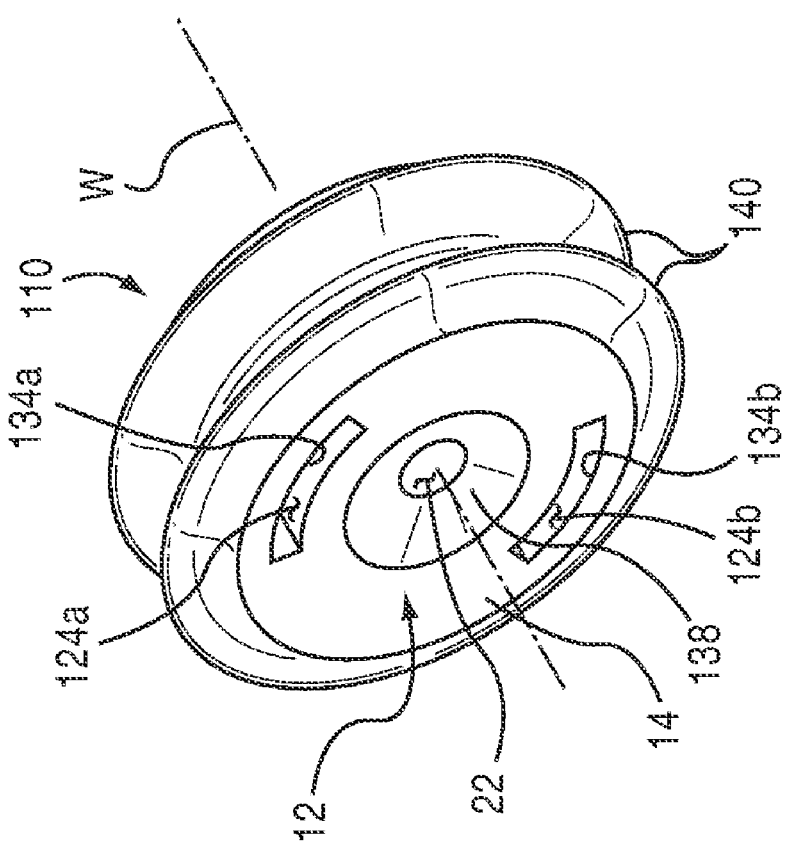

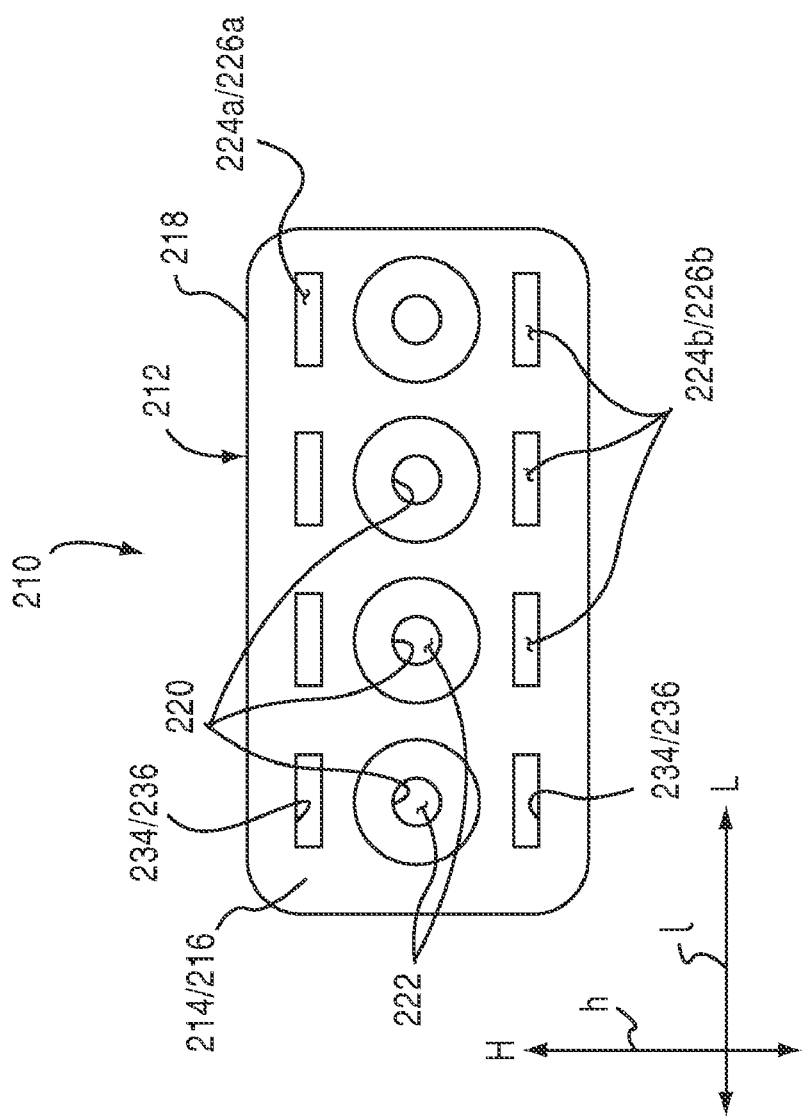
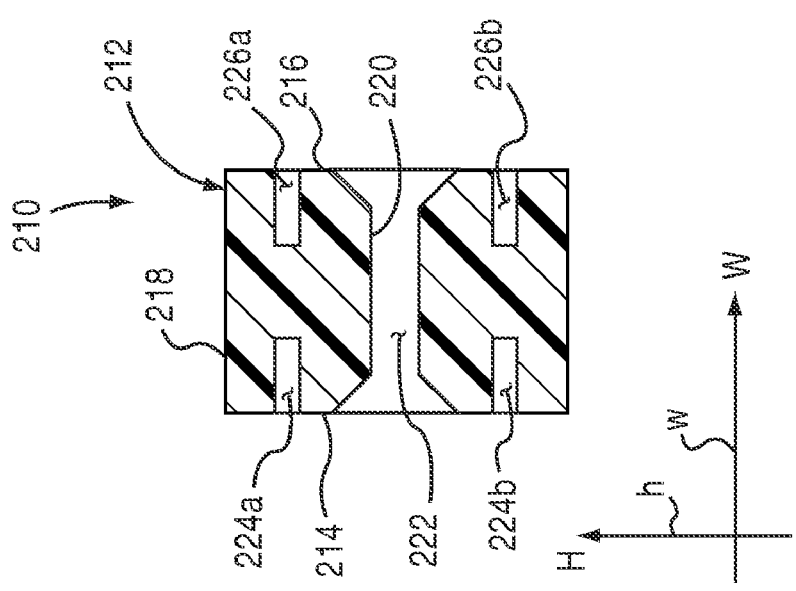

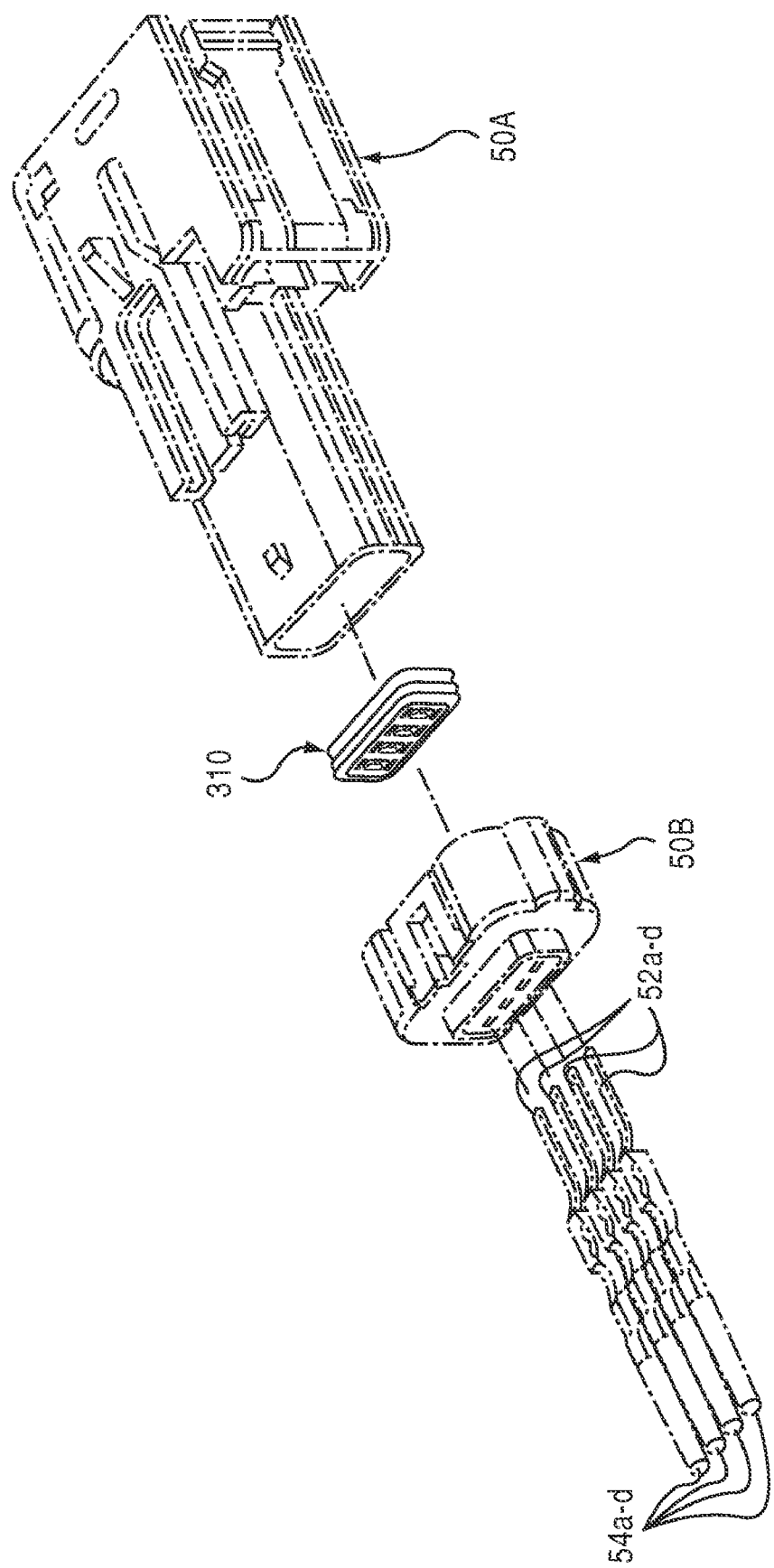

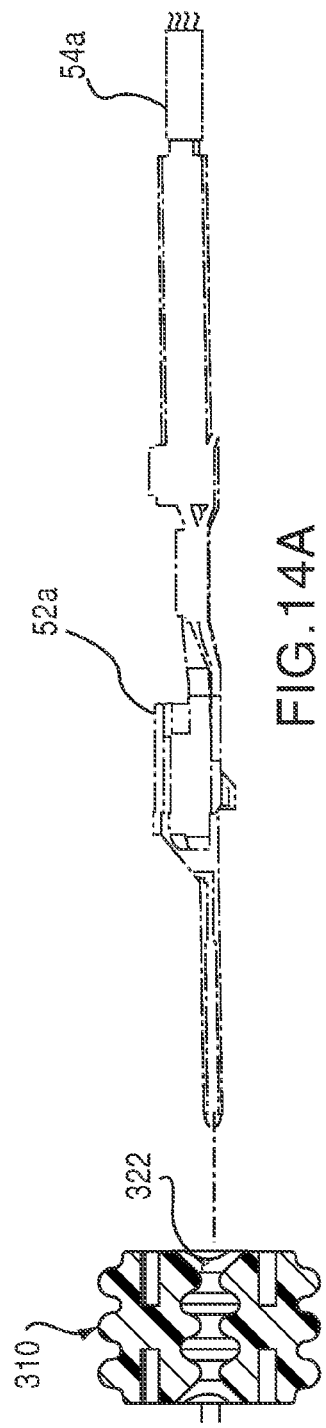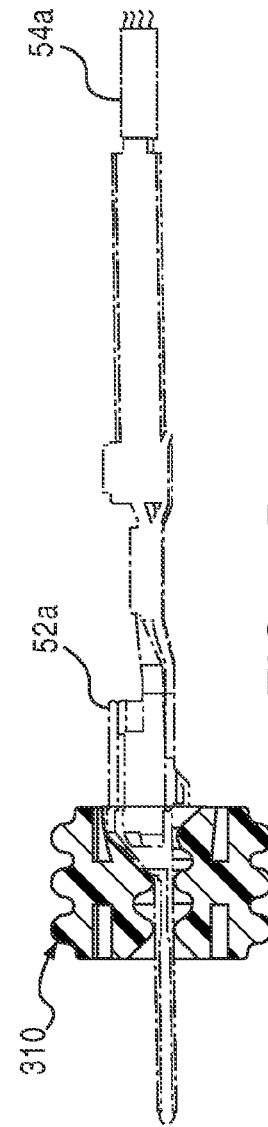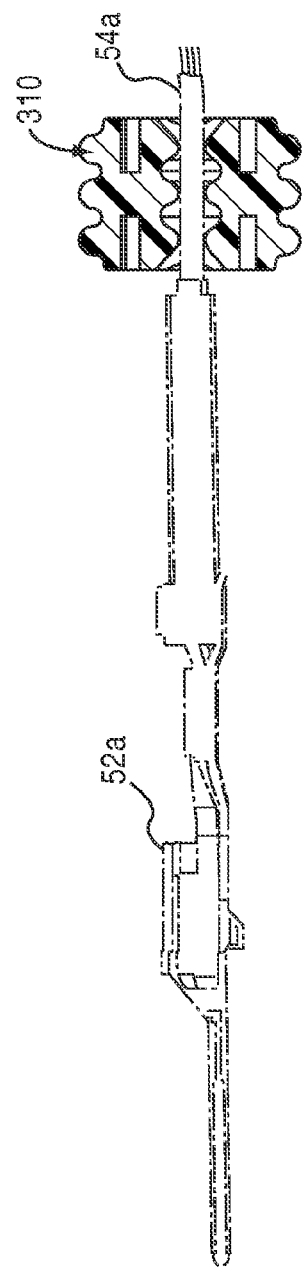

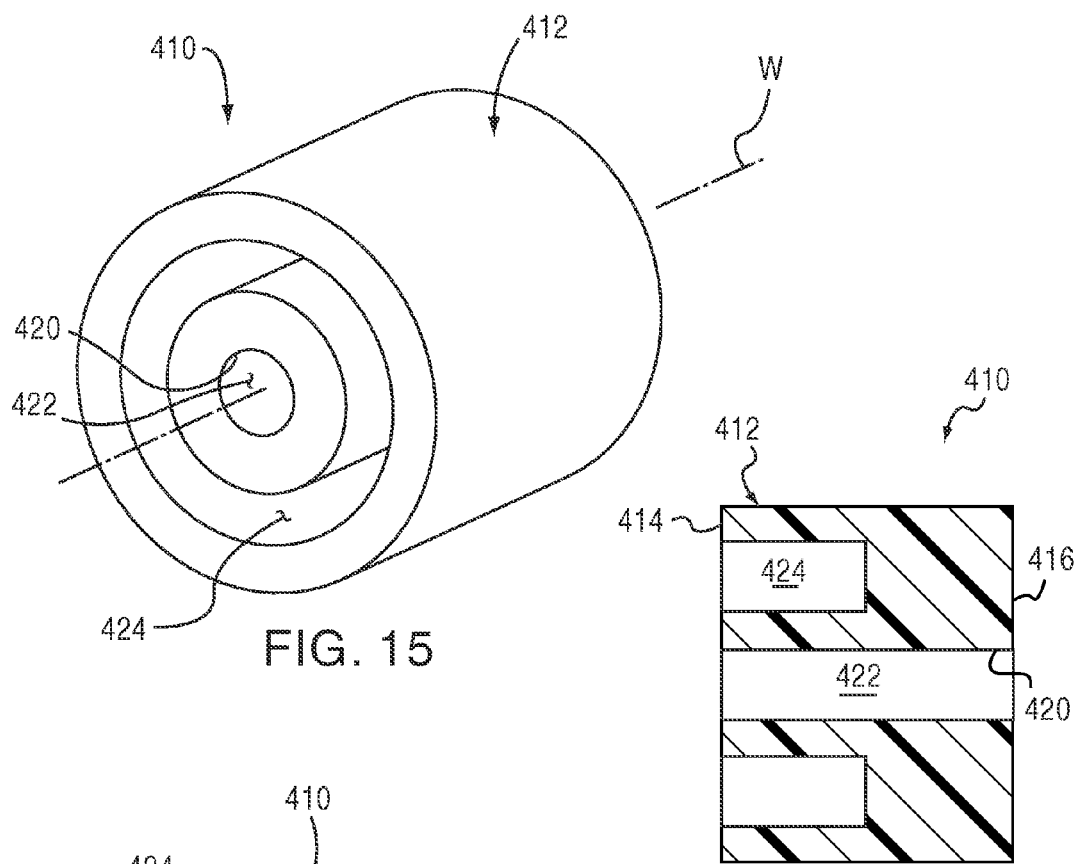
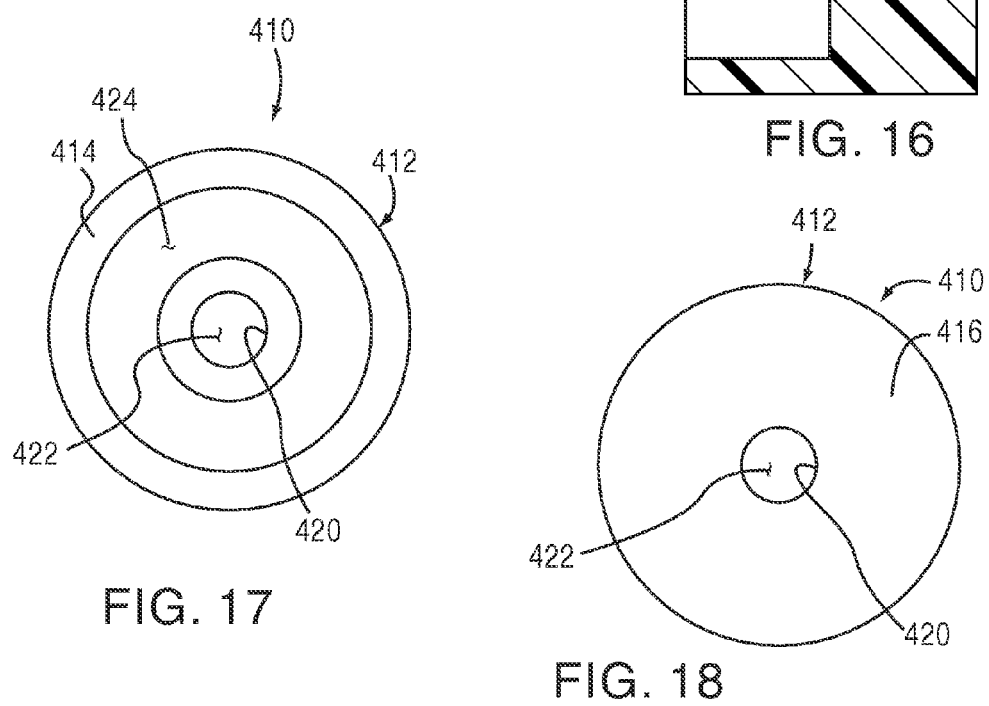

MATTE SEAL

FIELD OF THE INVENTION

The present invention relates to a seal. More particularly, the present invention is directed to a matte seal.

BACKGROUND OF THE INVENTION

Conventional seals are often used in industry to prevent infiltration of a fluid into a device or structure or to prevent a fluid from leaking out of the device or structure. In some instances, conventional seals fabricated from rubber, resin or other resilient material commonly employed for seals are used to prevent moisture from entering into an electrical connector device. Such seals are typically referred to as "matte seals". A matte seal prevents fluid such as water or moisture from entering into the electrical connector device in order to prevent corrosion of the mated male and female electrical terminals crimped to respective end portions of electrical wire. The matte seal is disposed between an internal surface of the electrical connector and an outer surface of the wire connected to respective ones of the male or female terminals. More specifically, the matte seal makes sealing contact with the internal surface of the electrical connector device as well as with the outer surface of the wire thereby preventing infiltration of water and/or moisture into the electrical connector device.

A conventional matte seal has a through hole extending therethrough that receives the male or female electrical terminal during assembly. Typically, the terminal (whether male or female) is larger than the through hole of the conventional matte seal. Thus, when the terminal is threaded through the through hole of the conventional matte seal during assembly, damage sometimes occurs to the matte seal. In turn, the sealing capability of the damaged matte seal is reduced.

It would be beneficial to provide a matte seal designed to more readily receive a male or female electrical terminal during assembly that could prevent or inhibit damage to the matte seal thereby retaining or substantially retaining its sealing capability. The present invention provides this benefit.

OBJECTS AND SUMMARY OF THE INVENTION

It is an object of the invention to provide a matte seal designed to more readily receive a male or female electrical terminal during assembly that prevents or inhibits damage to the matte seal.

It is another object of the invention to provide a matte seal designed to more readily receive a male or female electrical terminal during assembly that prevents or inhibits damage to the matte seal so that it retains or substantially retains its sealing capability as intended.

Accordingly, a matte seal of the present invention is hereinafter described. The matte seal includes a seal body that extends along and about a width-wise axis and is fabricated from a resilient material. The seal body has a first surface and an opposite second surface extending parallel to the first surface and an outer peripheral surface extending to and between the first and second surfaces. The seal body also has an inner through hole surface defining a through hole extending along and about the width-wise axis and between and through the first and second surfaces. Further, the seal body has at least one recess formed into the first surface. The at least one recess is disposed apart from and between the inner through hole surface and the outer peripheral surface. Also, the at least one recess extends parallel to the width-wise axis and partially into the seal body.

These objects and other advantages of the present invention will be better appreciated in view of the detailed description of the exemplary embodiments of the present invention with reference to the accompanying drawings, in which:

BRIEF DESCRIPTION OF THE DRAWINGS

FIG. 4 is a perspective view of a second exemplary embodiment of a matte seal of the present invention.

FIG. 5 is a front side or rear side elevational view of the second exemplary embodiment the matte seal of the present invention.

FIG. 8 is a side elevational view shown in cross-section of the second exemplary embodiment of the matte seal of the present invention.

FIG. 9 is a front side or rear side elevational view of the third exemplary embodiment the matte seal of the present invention.

FIG. 13 is an exploded perspective view of the matte seal illustrated in FIGS. 10-12 arranged with a two-piece electrical connector and a plurality of electrical terminals crimped to respective electrical wires.

FIGS. 14A-14C are a series of side elevational views shown partially in cross-section illustrating an electrical terminal being threaded through the matte seal illustrated in FIGS. 10-12.

FIG. 15 is a perspective view of a fifth exemplary embodiment of a matte seal of the present invention.

FIG. 16 is a side elevational view shown in cross-section of the fifth exemplary embodiment of the matte seal of the present invention.

FIG. 17 is a front side elevational view of the fifth exemplary embodiment of the matte seal of the present invention.

FIG. 18 is a rear side elevational view of the fifth exemplary embodiment of the matte seal of the present invention.

DETAILED DESCRIPTION OF THE EXEMPLARY EMBODIMENTS

Hereinafter, embodiments of the present invention will be described with reference to the attached drawings. The structural components common to those of the prior art and the structural components common to respective embodiments of the present invention will be represented by the same symbols and repeated description thereof will be omitted.

Figure 1:
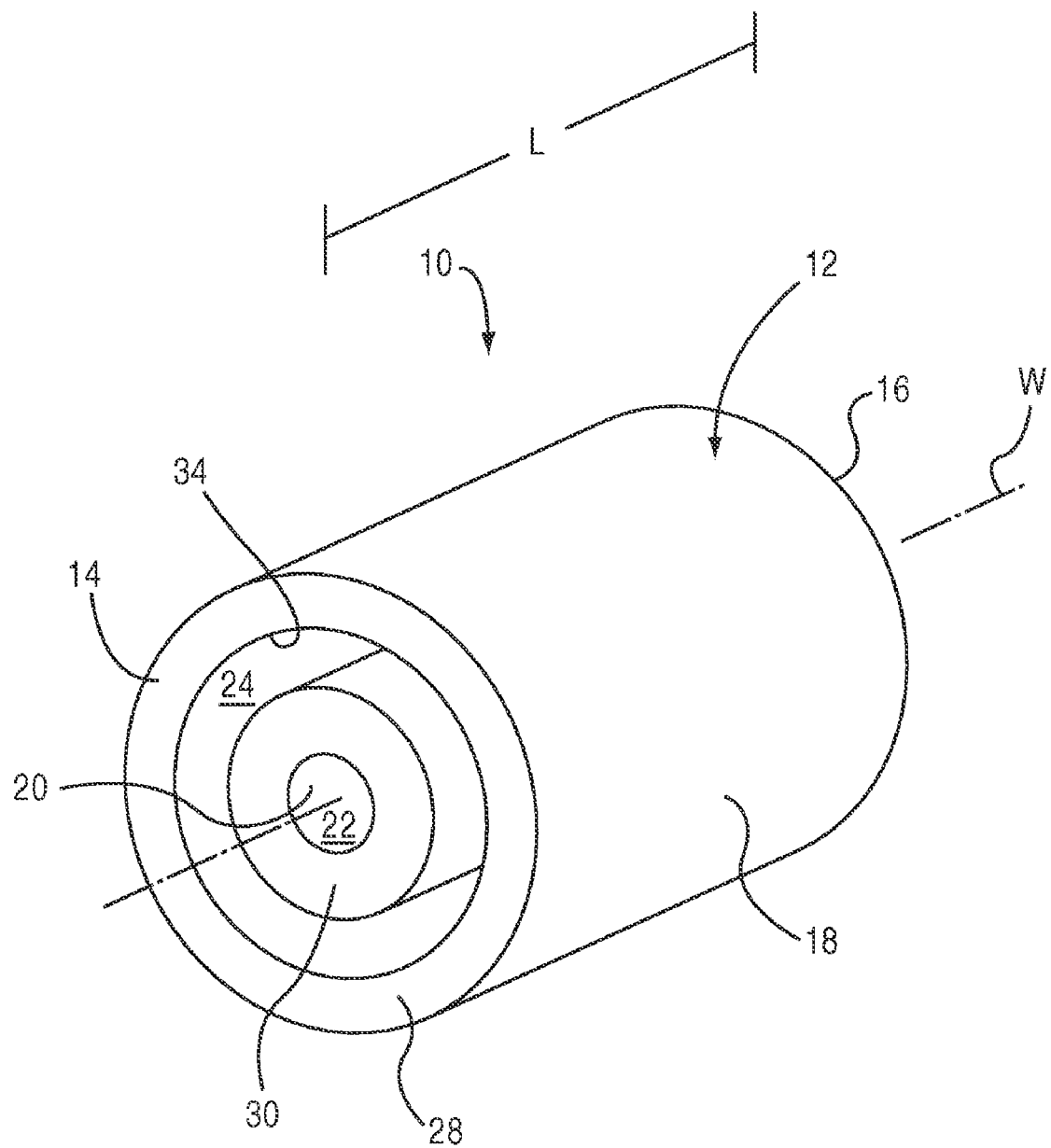
FIG. 1 is a perspective view of a first exemplary embodiment of a matte seal of the present invention.
Figure 3:
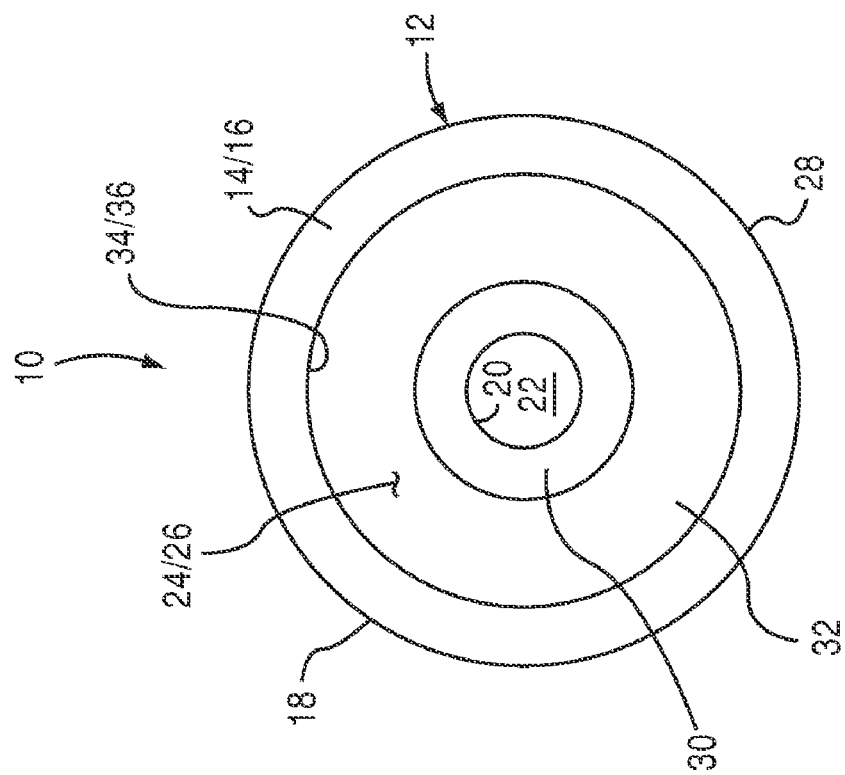
FIG. 3 is a front side or rear side elevational view of the first exemplary embodiment of the matte seal of the present invention.
Figure 2:
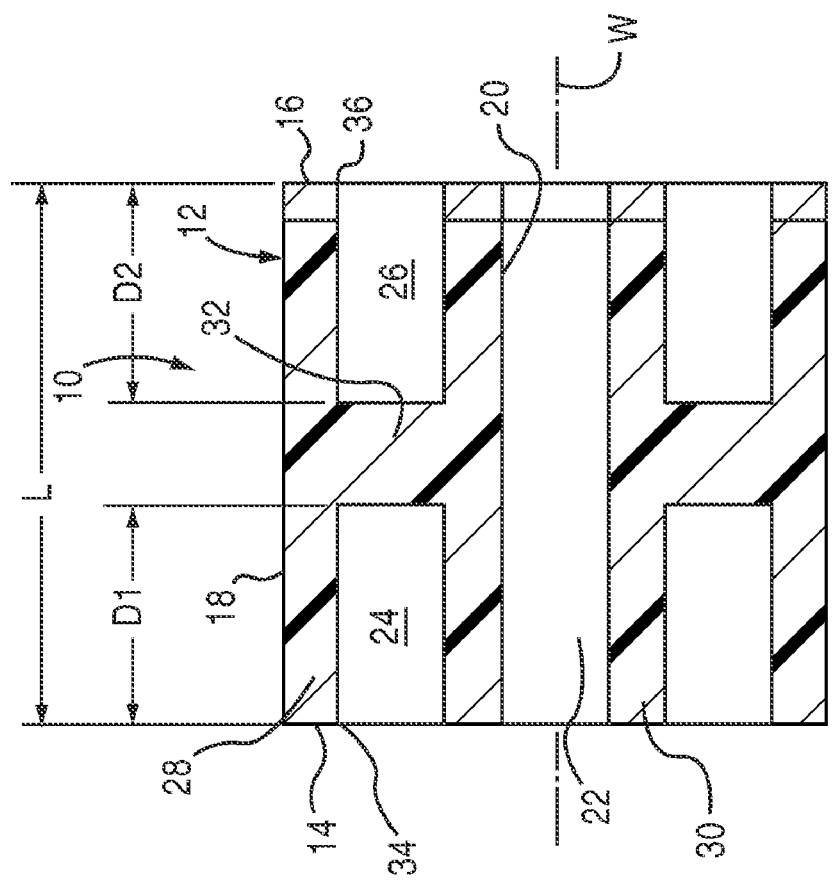
FIG. 2 is a side elevational view shown in cross-section of the first exemplary embodiment of the matte seal of the present invention.

A first exemplary embodiment of a matte seal 10 of the present invention is hereinafter described with reference to FIGS. 1-3. The matte seal 10 includes a cylindrically-shaped seal body 12 that extends along and about a width-wise axis W. The matte seal 10 is fabricated from a conventional resilient material such as rubber, resin or other similar material typically used for conventional seals. As best shown in FIGS. 2 and 3, the seal body 12 has a first surface 14 and an opposite second surface 16. The first surface 14 and the second surface 16 extend generally parallel to one another as best illustrated in FIG. 2. With reference to FIGS. 1-3, the seal body 12 also includes an outer peripheral surface 18. The outer portion will surface 18 extends to and between the first and second surfaces 14 and 16 a shown in FIG. 2. Additionally, the seal body 12 has an inner through hole surface 20. The inner through hole surface 20 defines a through hole 22 that extends along and about the width-wise axis W and between and through the first and second surfaces 14 and 16 respectively.

With reference to FIGS. 1-3, the seal body 12 has a first recess 24 and a second recess 26. The first recess 24 is formed into the first surface 14. The second recess 26 is formed into the second surface 16. Each one of the first recess 24 and the second recess 26 is disposed apart from and between the inner through hole surface 20 and the outer peripheral surface 18. Also, each one of the first recess 24 and the second recess 26 extends parallel to the width-wise axis W. Also, as specifically depicted in FIG. 2, each one of the first recess 24 and the second recess 26 only extend only partially into the seal body 12. One of ordinary skill in the art would appreciate that, for the first exemplary embodiment of the matte seal 10 of the present invention, the matte seal 10 is formed by an outer hollow tube 28 surrounding an inner hollow tube 30 with the outer and inner hollow tubes 28 and 30 respectively connected internally together by an annulus 32 as an integral construction.

In FIGS. 1-3, the first recess 24 commences at the first surface 14 to define a first recess opening 34 into the seal body 12. As best shown in FIGS. 2 and 3, the second recess 26 commences at the second surface 16 to define a second recess opening 36. Although not by way of limitation, respective ones of the first and second recess openings 34 and 36 of the first embodiment of the matte seal 10 are formed in an annular shape, i.e. in a shape of an annulus. Also, although not by way of limitation, the outer peripheral surface 18 and the inner through hole surface 20 are formed in cylindrical shapes. However, one of ordinary skill in the art would appreciate that, for the first exemplary embodiment of the matte seal 10 of the present invention, at least one of the outer peripheral surface 18 and the inner through hole surface 20 is formed in a cylindrical shape.

As depicted in FIGS. 1 and 2, the outer peripheral surface 18 extends to and between the first and second surfaces 14 and 16 respectively at a length L. Also, as best shown in FIG. 2, the first recess 24 extends into the seal body 12 at a first distance D1 and the second recess 26 extends into the seal body 12 at a second distance D2. As visually noted in FIG. 2, the first distance D1 plus the second distance D2 is less than the length L. By way of example only for the first exemplary embodiment of the matte seal 10 of the present invention and not by way of limitation, the distance D1 equals the distance D2.

Figure 6:
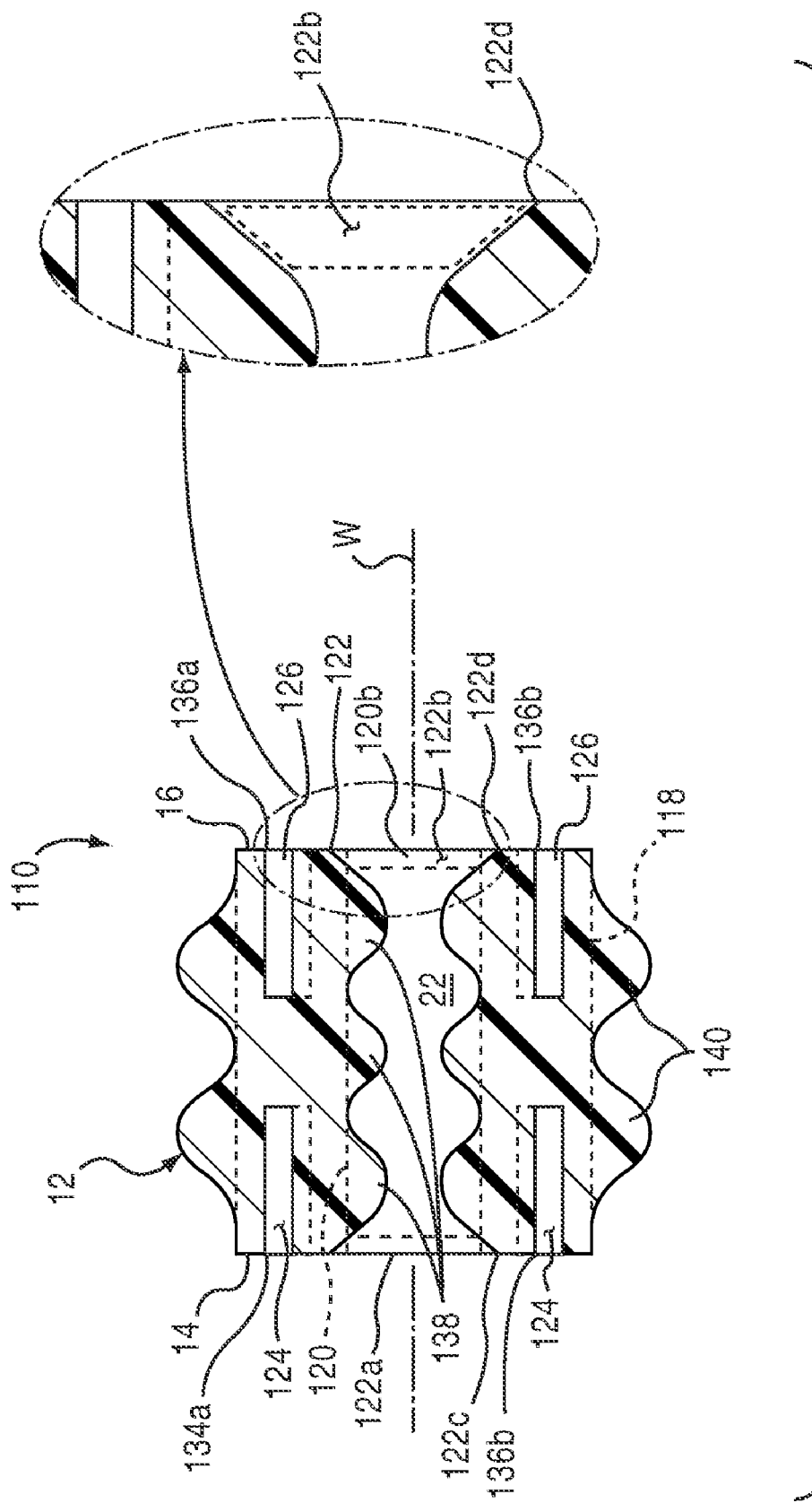
FIG. 6 is a side elevational view shown in cross-section of the second exemplary embodiment of the matte seal of the present invention.

A second exemplary embodiment of a matte seal 110 of the present invention is introduced in FIGS. 4-6. The matte seal 110 is similar to the first embodiment of the present invention described above except as described hereinafter. The seal body 12 has a pair of first recesses 124a and 124b, a pair of second recesses 126a and 126b, a plurality of inner ribs 138 and a plurality of outer ribs 140.

A pair of the first recesses 124a and 124b are formed into the first surface 14 and a pair of the second recesses 126a and 126b are formed into the second surface 16. Respective ones of the first pair of the first recesses 124a and 124b are disposed diametrically from one another with an inner through hole 122 disposed therebetween. Respective ones of the second pair of the second recesses 126a and 126b are disposed diametrically from one another with the inner through hole 122 disposed therebetween. Each one of the first and second recesses 124a, 124b, 126a and 126b extends parallel to the width-wise axis W and partially into the seal body 12.

In FIGS. 4-6, each one of the pair of the first recesses 124a and 124b commences at the first surface 14 to define respective first recess openings 134a and 134b into the seal body 12. Also, each one of the pair of the second recess 126a and 126b commences at the second surface 16 to define respective second recess openings 136a and 136b. Although not by way of limitation, respective ones of each pair of the first and second recess openings 134a, 134b, 136a and 136b of the second embodiment of the matte seal 110 are formed in an arcuate shape.

As best shown in FIG. 6, the matte seal 110 includes the plurality of inner ribs 138. Each one of the plurality of inner ribs 138 are integrally connected to the inner through hole surface 120 (represented by the dashed line 120) and project into and extend circumferentially about the inner through hole 120 relative to the width-wise axis W. However, one of ordinary skill in the art would appreciate that the second exemplary embodiment of the matte seal 110 of the present invention might include at least one inner rib 138 without departing from the spirit of the invention.

Also, as that shown in FIG. 6, the matte seal 110 includes the plurality of the outer ribs 140. Each one of the plurality of the outer ribs 140 are integrally connected to the outer peripheral surface 118 (represented by the dashed line 118) and projects outwardly from and extends circumferentially about the outer peripheral surface 118 relative to the width-wise axis W. However, one of ordinary skill in the art would appreciate that the second exemplary embodiment of the matte seal 110 of the present invention might include at least one outer rib 140 without departing from the spirit of the invention.

Furthermore, with respect to FIG. 6, the inner through hole 122 has a first inner through hole portion 122a and a second inner through hole portion 122b. The first inner through hole portion 120a commences at the first surface 14 to define a first inner through hole opening 122c and tapers inwardly into the seal body 12 relative to the width-wise axis W. The second inner through hole portion 122b commences at the second surface 16 to define a second inner through hole opening 122d and tapers inwardly into the seal body 12 relative to the width-wise axis W. A skilled artisan would appreciate that each one of the first inner through hole portion 122a and the second inner through hole portion forms a conically-shaped frustum as best shown in FIGS. 4 and 6. Also, for the second exemplary embodiment of the matte seal 110 of the present invention, respective ones of the first inner through hole opening 122c and the second inner through hole opening 122d are configured in a circular shape.

Figure 7:
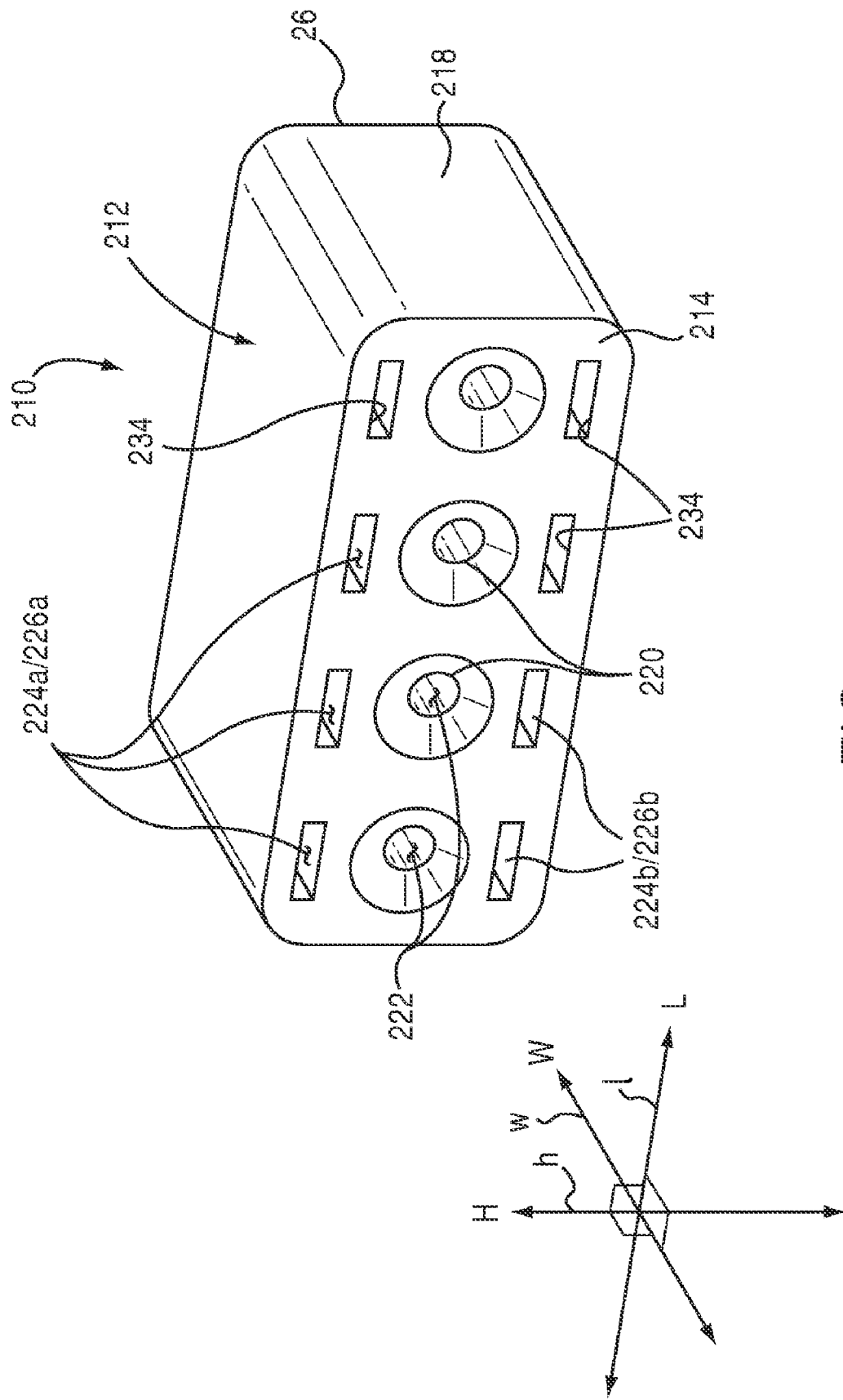
FIG. 7 is a perspective view of a third exemplary embodiment of a matte seal of the present invention.

A third exemplary embodiment of a matte seal 210 of the present invention is illustrated in FIGS. 7-9. The third exemplary embodiment of the matte seal 210 includes features of the first and second exemplary embodiments described above. However, a skilled artisan would not consider it necessary to repeat the detailed description of these features. Therefore, obvious features redundant to the first and second exemplary embodiments of the matte seal discussed above and shown in the drawing figures will not be further discussed.

As best shown in FIG. 7, a seal body 212 extends along and about the width-wise axis W, a length-wise axis L and a height-wise axis H. As illustrated in FIG. 7, the width-wise axis W, the length-wise axis L and the height-wise axis H are oriented perpendicularly relative to each other with the width-wise axis W defining a width-wise direction w, the length-wise axis defining a length-wise direction L and the height-wise axis defining a height-wise direction h. The seal body 212 having a generally rectangular shape has a first surface 214, an opposite second surface 216 and an outer peripheral surface 218. The second surface 216 extends parallel to the first surface 214 with the first and second surfaces 14 and 16 respectively extending in the length-wise direction l and height-wise direction h. The outer peripheral surface 218 extends to and between the first and second surfaces 214 and 216 respectively. The seal body 212 has a plurality of inner through hole surfaces 220 aligned in a juxtaposed manner in the length-wise direction l as best shown in FIG. 9.

As shown in FIG. 8, each inner through hole surface 220 defines a respective inner through hole 222 extending in the width-wise direction w between and through the first and second surfaces 214 and 216. As illustrated in FIGS. 7 and 9, the seal body 212 has a plurality of pairs of first recesses 224a and 224b formed into the first surface 214 and a plurality of pairs of second recesses 226a and 226b formed into the second surface 216. Respective ones of the first recesses of each pair of the first recesses 224a and 224b are disposed diametrically from one another with a respective one of the inner through holes 222 being disposed therebetween. Respective ones of the second recesses of each pair of the second recesses 226a and 226b are disposed diametrically from one another with a respective one of the inner through holes 222 being disposed therebetween. As shown in FIG. 8, each one of the first and second recesses 224a, 224b, 226a and 226b extend parallel to the width-wise axis W and partially into the seal body 212.

More specifically and with reference to FIGS. 7 and 9, with respect to one pair of the plurality of pairs of the first recesses 224a and 224b disposed diametrically from one another, one of the first recesses, i.e. 224a, is positioned above a respective one of the inner through holes 222 in the height-wise direction h and a remaining one of the first recesses, i.e. 224b, is positioned below the respective one of the inner though holes 222 in the height-wise direction h. Also, with respect to one pair of the plurality of pairs of the second recesses 226a and 226b disposed diametrically from one another, one of the second recesses, i.e. 226a, is positioned above a respective one of the inner through holes 222 in the height-wise direction h and a remaining one of the second recesses, i.e. 226b, is positioned below the respective one of the inner though holes in the height-wise direction h.

As shown in FIGS. 7 and 9, each first recess 224a or 224b commences at the first surface 214 to define a respective first recess opening 234 into the seal body 212 and each second recess 226a or 226b commences at the second surface 216 to define a respective second recess opening 236. For the third exemplary embodiment of the matte seal 210 of the present invention, respective ones of the first and second recess openings 234 and 236 are formed in a square shape.

Figure 10:
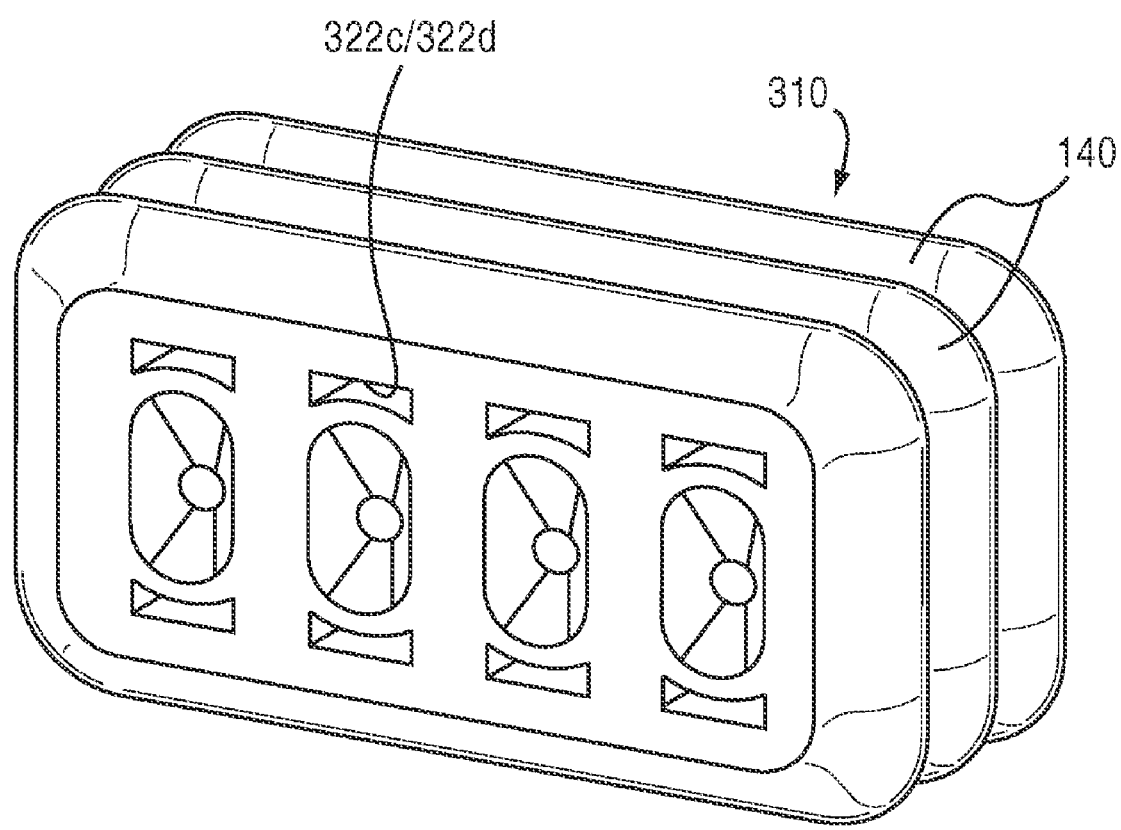
FIG. 10 is a perspective view of a fourth exemplary embodiment of a matte seal of the present invention.
Figure 12:
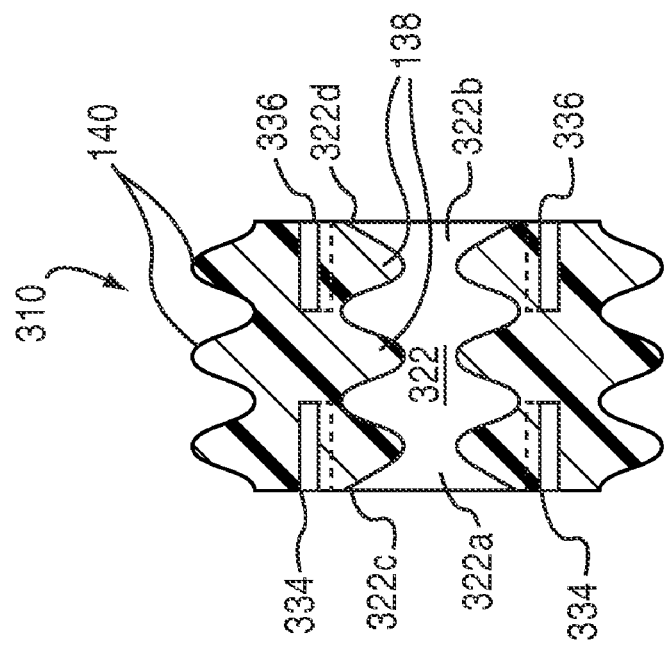
FIG. 12 is a side elevational view shown in cross-section of the fourth exemplary embodiment of the matte seal of the present invention.
Figure 11:
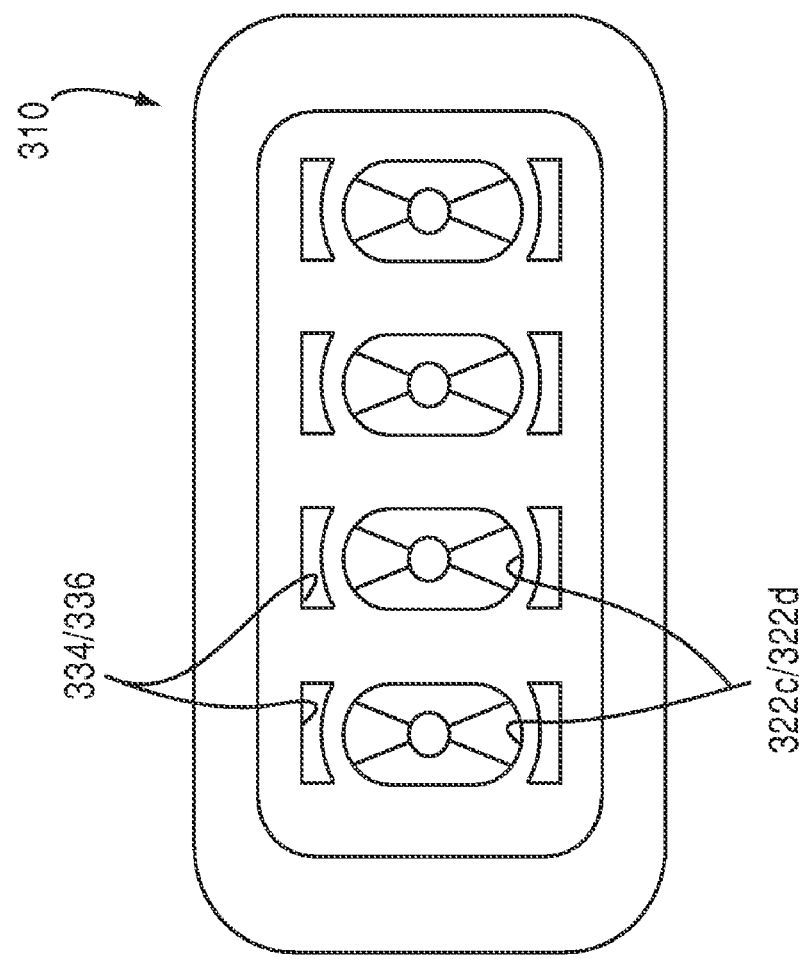
FIG. 11 is a front side or rear side elevational view of the fourth exemplary embodiment of the matte seal of the present invention.

A fourth exemplary embodiment of a matte seal 310 is introduced in FIGS. 10-12. The matte seal 310 includes features of the other exemplary embodiments discussed above including inner ribs 138 and outer ribs 140. However, the configuration of the respective first and second recess openings 334 and 336, the configuration of the inner through hole openings 322c and 322d and the configuration of the respective inner through hole portions 322a and 322b of the inner through hole 322 are different. Note that the first and second recess openings 334 and 336 are partially square shaped and partially arcuate shaped, the inner through hole openings 322c and 322d are oval shaped and the respective inner through hole portions 322a and 322b are shaped as a partially-flattened frustum.

However, the configuration of the respective first and second recess openings 334 and 336, the configuration of the inner through hole openings 322c and 322d and the configuration of the respective inner through hole portions 322a and 322b of the inner through hole 322 are different. Note that the first and second recess openings 334 and 336 are partially square shaped and partially arcuate shaped, the inner through hole openings 322c and 322d are oval shaped and the respective inner through hole portions 322a and 322b are shaped as a partially-flattened frustum.

By way of example only in FIG. 13, the fourth exemplary embodiment of the matte seal 310 of the present invention is arranged for assembly with a two-piece electrical connector housing 50A/50B and a plurality of electrical terminals 52a-d crimped to respective wires 54a-d. For ease of understanding the present invention, only a single electrical terminal 52a crimped to a wire 54a is shown being inserted through the matte seal 310 is illustrated in FIGS. 14A-14C. Note in FIG. 14B, the inner through hole 322 can stretch towards the first and second recesses 334 and 336 when the enlarged electrical terminal 52a is inserted therethrough. It is theorized that this stretching helps to prevent damage to the matte seal 310 upon assembly.

One of ordinary skill in the art will appreciate that the two-piece electrical connector housing 50A/50B and the plurality of electrical terminals 52a-d crimped to be respective wires 54a-d are used as "workpiece" examples for purposes of illustrating only one use of the present invention. A skilled artisan would comprehend that other uses and corresponding workpieces such as nozzles, hoses, sensors and the like can be employed with the present invention without departing from the spirit and inventive concepts discussed herein. Although not by way of limitation, a workpiece could be any object that is larger than the inner sealing surface of the seal such that the object is to be inserted through the seal after the seal has been installed into an assembly housing.

A fifth exemplary embodiment of a matte seal 410 is introduced in FIGS. 15-18. The matte seal 410 includes many of the features of the first exemplary embodiment of the matte seal 10 discussed. The matte seal 410 includes a cylindrically-shaped seal body 412 that extends along and about the width-wise axis W. As shown in FIGS. 16-18, the seal body 412 has a first surface 414 and an opposite second surface 416. The first surface 414 and the second surface 416 extend generally parallel to one another as illustrated in FIG. 16. The seal body 412 has an inner through hole surface 420. The inner through hole surface 20 defines a through hole 422 that extends along and about the width-wise axis W and between and through the first and second surfaces 414 and 416 respectively.

The distinguishing feature between the first embodiment of the matte seal 10 and the matte seal 410 is that the matte seal 410 has only a first recess 424 formed into the first surface 414 as shown in FIGS. 15-18. The second surface 416 has no corresponding recess as in the first embodiment of the matte seal 10. In summary, the second surface 416 has a flat, donut-shape as best shown in FIG. 18 with the through hole 422 extending centrally therethrough.

Although not by way of limitation, a skilled artisan would appreciate that all of the exemplary embodiments of the matte seal of the present invention described above is formed as an integral construction.

It is appreciated that the matte seal of the present invention is designed to more readily receive a male or female electrical terminal during assembly in order to prevent or inhibit damage to the matte seal. With little or no damage to the matte seal after assembly, the matte seal retains or substantially retains its sealing capability as intended.

The present invention, may, however, be embodied in various different forms and should not be construed as limited to the exemplary embodiments set forth herein; rather, these exemplary embodiments are provided so that this disclosure will be thorough and complete and will fully convey the scope of the present invention to those skilled in the art.

What is claimed is:

1. A matte seal, comprising:
   a seal body extending along and about a width-wise axis and fabricated from a resilient material, the seal body fabricated as an integral construction and having a first surface defining a flat first surface plane, an opposite second surface defining a flat second surface plane and an outer peripheral surface, the flat first surface plane and the flat second surface plane extending parallel to one another, the outer peripheral surface extending to and between the first and second surfaces, the seal body having an inner through hole surface defining a through hole extending continuously and generally centrally along and about the width-wise axis and between and through the first and second surfaces defined by the flat first and second surface planes respectively, the seal body having a first recess commencing at the flat first surface plane and formed into the first surface and a second recess commencing at the flat second surface plane and formed into the second surface, each one of the first and second recesses being disposed apart from and between the inner through hole surface and the outer peripheral surface, each one of the first and second recesses extending parallel to the width-wise axis and partially into the seal body and being isolated from yet adjacent to the inner through hole.

2. A matte seal according to claim 1, wherein the first recess commences at the first surface to define a first recess opening into the seal body and the second recess commences at the second surface to define a second recess opening, respective ones of the first and second recess openings are formed in one of an annular shape, a square shape and an arcuate shape.

3. A matte seal according to claim 1, wherein at least one of the outer peripheral surface and the inner through hole surface is formed in a cylindrical shape.

4. A matte seal according to claim 3, further comprising at least one inner rib integrally connected to the inner through hole surface and projecting into and extending circumferentially about the inner through hole relative to the width-wise axis.

5. A matte seal according to claim 3, further comprising at least one outer rib integrally connected to the outer peripheral surface and projecting outwardly from and extending circumferentially about the outer peripheral surface relative to the width-wise axis.

6. A matte seal according to claim 1, wherein the outer peripheral surface extends to and between the first and second surfaces at a length L, the first recess extends into the seal body at a first distance D1 and the second recess extends into the seal body at a second distance D2 such that the first distance D1 plus the second distance D2 is less than the length L.

7. A matte seal according to claim 1, wherein the inner through hole has a first inner through hole portion commencing at the first surface to define a first inner through hole opening and tapering inwardly into the seal body relative to the width-wise axis and a second inner through hole portion commencing at the second surface to define a second inner through hole opening and tapering inwardly into the seal body relative to the width-wise axis.

8. A matte seal according to claim 7, wherein each one of the first inner through hole portion and the second inner through hole portion forms a conically-shaped frustum.

9. A matte seal according to claim 7, wherein respective ones of the first inner through hole opening and the second inner through hole opening are configured in one of a circular shape and an oval shape.

10. A matte seal, comprising:
    a seal body extending along and about a width-wise axis, a length-wise axis and a height-wise axis, the width-wise axis, the length-wise axis and the height-wise axis being oriented perpendicularly relative to each other, the width-wise axis defining a width-wise direction, the length-wise axis defining a length-wise direction and the height-wise axis defining a height-wise direction, the seal body fabricated as an integral construction and having a first surface, an opposite second surface and an outer peripheral surface, the second surface extending parallel to the first surface with the first and second surfaces extending in the length-wise and height-wise direction, the outer peripheral surface extending to and between the first and second surfaces, the seal body having a plurality of inner through hole surfaces aligned in a juxtaposed manner in the length-wise direction, each inner through hole surface extending continuously and generally centrally along and about a respective width-wise through-hole axis and between and through the first surface defined by a flat first surface plane and a second surface defined by a flat second surface plane extending parallel to the flat first surface plane, each inner through hole surface defining a respective inner through hole extending in the width-wise direction between and through the first and second surfaces, the seal body having a plurality of pairs of first recesses formed into the first surface and a plurality of pairs of second recesses formed into the second surface, respective ones of the first recesses of each pair of the first recesses being disposed diametrically from one another in the height-wise direction with a respective one of the inner through holes disposed therebetween, respective ones of the second recesses of each pair of the second recesses being disposed diametrically from one another in the height-wise direction with a respective one of the inner through holes disposed therebetween, each one of the first and second recesses extending parallel to the width-wise axis and partially into the seal body, respective ones of the width-wise through-hole axes being aligned on and along the length-wise axis.

11. A matte seal according to claim 10, wherein, with respect to one pair of the plurality of pairs of the first recesses disposed diametrically from one another, one of the first recesses is positioned above a respective one of the inner through holes in the height-wise direction and a remaining one of the first recesses is positioned below the respective one of the inner though holes in the height-wise direction and, with respect to one pair of the plurality of pairs of the second recesses disposed diametrically from one another, one of the second recesses is positioned above a respective one of the inner through holes in the height-wise direction and a remaining one of the second recesses is positioned below the respective one of the inner though holes in the height-wise direction.

12. A matte seal according to claim 11, wherein each first recess commences at the first surface to define a respective first recess opening into the seal body and each second recess commences at the second surface to define a respective second recess opening, respective ones of the first and second recess openings are formed in one of a square shape and an arcuate shape.

13. A matte seal according to claim 10, wherein at least one of the outer peripheral surface and the inner through hole surface is formed in a cylindrical shape.

14. A matte seal according to claim 10, further comprising at least one inner rib integrally connected to the inner through hole surface and projecting into and extending circumferentially about the inner through hole relative to the width-wise axis.

15. A matte seal according to claim 10, further comprising at least one outer rib integrally connected to the outer peripheral surface and projecting outwardly from and extending circumferentially about the outer peripheral surface relative to the width-wise axis.

16. A matte seal according to claim 10, wherein the outer peripheral surface extends to and between the first and second surfaces at a length L, the first recess extends into the seal body at a first distance D1 and the second recess extends into the seal body at a second distance D2 such that the first distance D1 plus the second distance D2 is less than the length L.

17. A matte seal according to claim 10, wherein the inner through hole has a first inner through hole portion commencing at the first surface to define a first inner through hole opening and tapering inwardly into the seal body relative to the width-wise axis and a second inner through hole portion commencing at the second surface to define a second inner through hole opening and tapering inwardly into the seal body relative to the width-wise axis.

18. A matte seal according to claim 17, wherein each one of the first inner through hole portion and the second inner through hole portion forms conically-shaped frustum.

19. A matte seal according to claim 17, wherein respective ones of the first inner through hole opening and the second inner through hole opening are configured in one of a circular shape and an oval shape.

* * * * *